United States Patent Office 3,468,841
Patented Sept. 23, 1969

3,468,841
COMPOSITIONS OF CARBON BLACK AND POLYACRYLONITRILE AND METHOD FOR THEIR PREPARATION
Paul Jacques Corbiere and Jean-Baptiste Rosset, Lyon, France, assignors to Crylor, Paris, France, a French body corporate
No Drawing. Filed May 2, 1966, Ser. No. 546,563
Claims priority, application France, May 10, 1965, 16,473
Int. Cl. C08f 1/84, 45/08, 27/00
U.S. Cl. 260—41.5                    5 Claims

ABSTRACT OF THE DISCLOSURE

Intensely black acrylonitrile filaments are made, having a carbon black content of 10–35% in the form of particles of diameter less than 1 cm. Acrylonitrile is adsorbed on carbon black, and then polymerised in the presence of water. (Other polymerisation conditions are not suitable.) The product is dissolved in an organic solvent such as dimethylformamide, and filaments are made from the solution, preferably by wet spinning.

---

This invention relates to filamentary materials, including fibres and threads, of an acrylonitrile polymer pigmented with carbon black.

United States Patent 3,117,943, of the same assignee describes the production of pigment materials based on finely divided carbon black, by adsorbing an addition polymerisable monomer, especially acrylonitrile with or without another monomer copolymerisable therewith, on carbon black and polymerising the acrylonitrile, and other monomer if present, "in situ," in the presence or absence of a liquid organic medium; the composition obtained contains carbon black in the form of particles of diameter less than $0.5\mu$, and may be incorporated in a solution from which artificial fibres or threads are to be spun. By this means there can be obtained products whose carbon black content is close to that of normal pigmented threads, namely in the neighbourhood of 4%.

It has now surprisingly been found that, by using a pigment composition obtained by a method similar to that described above, it is possible to obtain acrylonitrile polymer fibres and threads of very much higher pigment content.

In one aspect the invention comprises fibres and threads, and textile materials and articles containing them, which consist of 65 to 90% of an acrylonitrile polymer and 10 to 35% of carbon black in the form of particles of diameter less than $0.5\mu$. (Proportions are by weight unless otherwise stated.)

In another aspect the invention comprises the production of such fibres and threads by adsorbing acrylonitrile, with or without a monomer copolymerisable therewith, on carbon black, polymerising the adsorbed material in the presence of water, if necessary removing the product from excess water, then dissolving it in a solvent for the polymer formed, and then forming threads or fibres from the solution by a known method of spinning.

(It will be understood that, strictly speaking, only the adsorbed polymer is actually dissolved, the very fine carbon black being in the form of a suspension in the solution of the polymer. Since however the resulting composition behaves for ordinary purposes as a true solution owing to the pure state of subdivision of the carbon black, it is convenient to refer to it as such, and to its production as an act of dissolving.)

The term "acrylonitrile polymer" has here its usual meaning of acrylonitrile homopolymer, and random and block copolymers, graft copolymers and mixtures of polymers containing at least 95% by weight of acrylonitrile units and up to 5% by weight of comonomer units; examples of ethylenic monomers which are copolymerisable with acrylonitrile and can be used to make copolymers for use in the invention are vinyl compounds, for example vinyl chloride and acetate; vinylidene chloride; acrylic and methacrylic acids, esters and amides and their derivatives, for example methyl acrcylate, methyl methacrylate and methacrylonitrile; vinyl sulphonic compounds such as aromatic sulphonated derivatives, for example styrenesulphonic acid; vinyloxyarenesulphonic acids and acryloxyalkoxyarenesulphonic acids; and basic vinyl derivatives such as vinylpyridine and its alkyl derivatives, and vinyl dialkylamine ethers.

As described in United States Patent No. 3,117,943, the carbon black can initially be in a commercially available form, and it is not necessary to grind it.

Whereas in the method of the above patent the polymerisation was carried out in the absence of a diluent or in an organic solvent, it is necessary for the present process, that the polymerisation should be carried out in water. Otherwise, it has been found that the molecular weight of the polymer formed is too low to give solutions of viscosity adequate for spinning at the normal concentrations. Generally, spinning solutions contain about 20 to 35%, and preferably 20 to 25%, of dry polymer, and have a viscosity of between 300 and 500 poises, e.g. about 400 poises. It is surprising that only by the method described above can products based on very finely divided carbon black and polymer be obtained which will give, on solution at the usual concentrations in the usual spinning solvents for the said polymer, solutions of a viscosity satisfactory for spinning under good conditions.

To ensure uniform adsorption of the monomer or monomers or their aqueous solution by the carbon black, simple stirring, or any appropriate equipment, may be used. This adsorption may be carried out under nitrogen, or under a carbon black vacuum if it takes place after degassing. To obtain the optimum result it is advisable that each particle of carbon black should have adsorbed the monomer or monomers or their aqueous solution to the same degree. If only the monomer or monomers are caused to be adsorbed by the carbon black, then the material is subsequently diluted by the amount of water necessary for the polymerisation, or by an aqueous solution of the monomer or monomers. The amount of water used will generally be sufficient to dissolve the monomer or monomers completely. Nevertheless, it is possible to use a smaller amount of water, and in that case the initially undissolved monomer or monomers pass into solution to the extent, and at the rate, that the monomer or monomers in solution polymerise.

The polymerisation is carried out in a manner known for polymerisations in an aqueous medium, in the presence of suitable polymerisation catalysts, such as those of the redox type. The product obtained after polymerisation is separated off, washed and dried. It contains 10 to 35% by weight of carbon black in the form of particles of diameter less than $0.5\mu$. It is then dissolved in a solvent for the polymer formed, for example dimethylformamide, to give a spinning solution of a normal concentration for the particular polymer. The solution thus obtained is thereafter spun by a known dry or wet spinning process (that is to say either in an evaporative atmosphere or in a coagulation bath), though for reasons of convenience it is generally preferred to work by wet spinning.

The threads so obtained may subsequently be subjected to hot drawing, as is usual for threads of acrylonitrile polymers, and optionally to a heat setting treatment in the extended state.

properties which are compared to those of a reference thread obtained from pure polyacrylonitrile;

TABLE I

|  | Before shrinking | | | After shrinking | |
|---|---|---|---|---|---|
|  | Dry strength in g./den. | Dry stretch, percent | Shrinkage at 120° C. | Dry strength in g./den. | Dry stretch, percent |
| Comparison sample | 3.37 | 13.6 | 12 | 3.05 | 18 |
| Thread from example | 2.25 | 14 | 16.7 | 1.73 | 24 |

By this means there can be obtained threads and fibres which are of a very beautiful irremovable black, and which consist of an acrylonitrile polymer and 10 to 35% by weight of carbon black; hitherto it has not been possible to obtain threads or fibres having such a content of carbon black. The dispersion of the carbon black in the threads or fibres is very fine, the carbon black being distributed in the form of particles of diameter less than $0.5\mu$, without it being necessary to resort to an intermediate grinding operation.

Furthermore, the threads and fibres show a considerable increase in conductivity if they are subsequently treated with cuprous ions followed by a heat treatment as described in French Patent 1,394,283, whereas comparison threads consisting of the same polymer (but without the carbon black) and subjected to the same treatment have an unchanged conductivity.

Though the compositions obtained by the polymerisation will usually be spun alone, they can, if desired, be spun mixed with other spinnable polymers.

The following example, in which the parts are parts by weight, is given as a typical illustration of the invention, without limiting it.

Example 1.8 parts of carbon black are introduced into a polymerisation vessel, and 6.5 parts of acrylonitrile dissolved in 91.7 parts of water at 25° C. are then added with vigorous stirring (1000 r.p.m.).

The mixture is purged with nitrogen and a gentle stream of this gas is maintained. Then 1.35 parts of N/2 aqueous sulphuric acid is added and the stirring continued for 4 hours.

0.6 part by weight of an aqueous solution containing 36% by weight of sodium bisulphite are added.

The mixture is stirred for a further 15 minutes and 0.65 part of potassium chlorate are then added. The polymerisation starts and the temperature rises by about 16° C.

When the temperature begins to fall a little ammonia is added to give a pH of 8 to 9, in order to stop the polymerisation.

After removing unreacted monomer by steam distillation, the reaction mixture is filtered under vacuum, and the filter cake is then washed and dried to constant weight at 60° C. and under atmospheric pressure.

A product containing 29% of carbon black is obtained.

This product is dissolved in dimethylformamide to give a 29% solids solution, containing 20.6% of polymer. This solution has a viscosity of 400 poises. After filtration, the solution is spun at a temperature of 70° C. through a spinneret having 128 orifices of diameter 0.085 mm. into a coagulating bath consisting of a 40% aqueous solution of dimethylformamide. The thread obtained is drawn 2.1×, washed with water, and then drawn in boiling water to 2.76×. It is finally heated to 120° C. in the relaxed state. The thread obtained has the following Both the comparison thread and the thread obtained as above are then treated with an aqueous solution containing cuprous ions, according to French Patent 1,394,283, and are then heated (a) for 5 minutes and (b) for 2 hours at 240° C. The resistance in ohms of these threads, measured on samples 2 cm. long, is shown in Table II.

TABLE II

|  | Comparison thread | Thread of Example |
|---|---|---|
| Untreated | $10^8$ to $10^{10}$ | $10^8$ to $10^{10}$ |
| Treated according to the French Patent (5 min. at 240° C.) | $10^9$ to $10^{13}$ | $10^3$ to $10^4$ |
| Treated according to the French Patent (2 hrs. at 240° C.) | $10^9$ to $10^{13}$ | $10^3$ to $10^4$ |

We claim:
1. As new products, filamentary materials consisting essentially of (a) 65–90% by weight of a polymer component selected from polyacrylonitrile, copolymers of acrylonitrile with another monomer in which the proportion of acrylonitrile is at least 95%, and mixtures of one of the above with another polymer compatible therewith, subject to an overall content of acrylonitrile of at least 95%, and (b) 10–35% by weight of carbon black distributed throughout the polymer in the form of particles of diameter less than $0.5\mu$.

2. A process for the production of filamentary materials having a high content of carbon black, which comprises adsorbing on carbon black a monomer composition comprising 95–100% by weight of acrylonitrile and 0–5% of another addition polymerisable monomer copolymerisable with acrylonitrile, polymerising the adsorbed monomer composition in the presence of water, dissolving the product in a solvent for the polymer formed, and spinning the solution so obtained.

3. A process according to claim 2, wherein the monomer composition is adsorbed on the carbon black in the substantial absence of a liquid diluent, and the product is brought into contact with water before the polymerisation.

4. A process according to claim 2, wherein the monomer composition is adsorbed by the carbon black in an aqueous medium.

5. A process according to claim 2, which comprises the additional steps of treating the filamentary materials with cuprous ions and then heating them to a temperature at which their electrical conductivity is substantially increased.

References Cited

UNITED STATES PATENTS 3,117,943 1/1964 Corbiere et al. _____ 210—41
3,117,943 1/1964 Corbiere et al. _____ 260—41

MORRIS LIEBMAN, Primary Examiner

S. L. FOX, Assistant Examiner

U.S. Cl. X.R.

252—502; 264—182